(12) United States Patent
Funk (10) Patent No.: US 8,225,095 B2
(45) Date of Patent: *Jul. 17, 2012

(54) PASSWORD-AUTHENTICATED ASYMMETRIC KEY EXCHANGE

(75) Inventor: Paul Funk, Cambridge, MA (US)

(73) Assignee: Juniper Networks, Inc., Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/976,370

(22) Filed: Dec. 22, 2010

(65) Prior Publication Data

US 2011/0107101 A1    May 5, 2011

Related U.S. Application Data

(63) Continuation of application No. 11/580,757, filed on Oct. 13, 2006, now Pat. No. 7,861,078.

(60) Provisional application No. 60/726,899, filed on Oct. 14, 2005.

(51) Int. Cl.
*H04L 9/32* (2006.01)

(52) U.S. Cl. ........ 713/171; 713/150; 713/155; 713/170; 713/184; 380/277; 380/278; 380/284

(58) Field of Classification Search .................. 713/150, 713/155, 184, 170–171; 380/277–278, 284
See application file for complete search history.

(56) References Cited

U.S. PATENT DOCUMENTS

| | | | |
|---|---|---|---|
| 5,222,136 A * | 6/1993 | Rasmussen et al. | 380/266 |
| 6,094,721 A | 7/2000 | Eldridge et al. | |
| 6,230,269 B1 | 5/2001 | Spies et al. | |
| 6,377,691 B1 | 4/2002 | Swift et al. | |
| 6,718,467 B1 | 4/2004 | Trostle | |
| 6,898,288 B2 | 5/2005 | Chui | |
| 7,047,408 B1 * | 5/2006 | Boyko et al. | 713/169 |
| 7,284,127 B2 | 10/2007 | Gehrmann | |
| 7,861,078 B2 | 12/2010 | Funk | |
| 2004/0111615 A1 | 6/2004 | Nyang et al. | |
| 2004/0158708 A1 | 8/2004 | Peyravian et al. | |
| 2005/0232428 A1 | 10/2005 | Little et al. | |
| 2005/0251680 A1 | 11/2005 | Brown et al. | |

OTHER PUBLICATIONS

Jablon, "Extended Password Key Exchange Protocols Immune to Dictionary Attack," IEEE, 1997, pp. 248-255.
Jablon, "Strong Password-Only Authenticated Key Exchange," Computer Communication Review, ACM SIGCOMM, Sep. 25, 1996, pp. 5-26.

* cited by examiner

*Primary Examiner* — Thanhnga B Truong
(74) *Attorney, Agent, or Firm* — Shumaker & Sieffert, P.A.

(57) ABSTRACT

Communicating keys between network devices on a network using asymmetric cryptographic techniques, for which asymmetric keys may be derived from a single (same) password. Knowledge or partial knowledge of the password may be the only information shared between parties prior to execution of a key exchange, and may be the only criteria by which one party will base trust in the other. A first network device may encrypt a key using a password-based key derived from a password, and authenticate a second device based on the second network device's ability to decrypt the encrypted key using a key derived from the same password. Knowledge of the password may be conveyed by the second device to the first device—a session key may be generated as a function of the decrypted key, and a function of this session key may be communicated from the second device to the first device.

14 Claims, 6 Drawing Sheets

PASSWORD-AUTHENTICATED ASYMMETRIC KEY EXCHANGE

This application is a Continuation of U.S. application Ser. No. 11/580,757, filed Oct. 13, 2006, which claims the benefit of U.S. Provisional Application No. 60/726,899, filed Oct. 14, 2005, the entire contents of each of which are incorporated herein by reference.

FIELD

This application is directed to cryptographic techniques employed on a communications network. In particular, this application is directed to a password-authenticated asymmetric key exchange (PAAKE) method enabling two or more parties on a network to authenticate one another and exchange keys based on a password shared between them.

BACKGROUND

Cryptography is the art and science of keeping messages secure. Cryptographic protocols enable parties to securely exchange information on a communications network. Cryptographic protocols typically involve the use of "keys", which are a string of bits used by algorithms for encrypting and decrypting information exchanged between parties. There are several resources available on the topic of cryptography, including, but not limited to, Applied Cryptography, 2d. Ed.; Protocols, Algorithms and Source Code in C, by Bruce Schneier, published by John Wiley & Sons, Inc., 1996.

"Authenticated Key Exchange" (AKE) is a general term for encryption protocols that allow two parties to exchange keys based on authentication of one of the parties by the other, or mutual authentication of each party by the other. When an AKE protocol bases authentication on a password, it is called a "Password-Based Authenticated Key Exchange" (PB-AKE or PBAKE).

Because passwords are typically weak—that is, they have low entropy in order to be easily remembered and all too often employ common words or obvious variants on common words—PB-AKE protocols should be designed to withstand off-line dictionary attacks in the event that a message exchange is visible to eavesdroppers. In general, such protocols should be "zero-knowledge"; that is, not only should it not be possible to mount a dictionary attack based on a single message exchange, but also each message exchange should not leak information about the password such that viewing multiple message exchanges would make it possible to succeed in a dictionary attack.

Additionally, a PB-AKE protocol should be made secure against active attack. That is, a party without knowledge of the password must not be able to gain such knowledge merely by participating in one or more protocol exchanges. Nor should an attacker be capable of completing the exchange successfully and acquiring a key without knowledge of the password. Additionally, it should not be possible to mount a man-in-the-middle attack, in which the message exchange flows through the attacker, who modifies messages in a manner that allows the attacker to acquire knowledge of either the password or resulting key.

There are generally two approaches to creating PB-AKE protocols. One is to hide the protocol within an encrypted tunnel based on the strong public key of one of the parties. This approach presumes a prior authentication of the party holding the strong public key; that is, one party must have the information necessary to trust the public key of the other. This information may, for example, be in the form of a trusted certificate attesting to that public key. While this approach has certain advantages, its limitation is that knowledge of the password itself is not sufficient to enable the protocol to operate.

The second approach is to use strong cryptography in the PB-AKE itself, relying on only knowledge of the shared password by both parties to enable the protocol to operate. Two known protocols that take this approach are the Encrypted Key Exchange (EKE) protocol and the Simplified Password-Authenticated Exponential Key Exchange (SPEKE) algorithm.

For PB-AKE exchanges, it may be desirable that one of the parties in the key exchange has only indirect knowledge of the password that is sufficient to allow it to participate in a PB-AKE exchange, but not sufficient to allow it to pose as an actual password-holder. For example, it may be desirable to allow a user to authenticate and exchange keys with a central server, but to avoid storing actual passwords in the server's database, lest that database be stolen or revealed.

Some known protocols, such as EKE and SPEKE, describe how indirect or derivative password information may be used by either party in the key exchange. However, these key exchange protocols must be "augmented" in order to allow the party with indirect password knowledge to confirm that other party has direct knowledge of the password. Otherwise, a central server or an attacker with access to the central server's password database would be able to pose as a user. These augmented exchanges involve additional strong cryptography beyond the key exchange itself.

SUMMARY

Described herein are systems and methods for communicating one or more keys between network devices on a communications network using asymmetric cryptographic techniques. That is, one or more keys may be encrypted on a first network device using a first key, and then be transmitted to one or more second network devices where the encrypted key is decrypted using a second key different than the first key. Such first and second keys are sometimes referred to herein as "asymmetric keys." In some embodiments, a communicated encrypted key may be a key of a key-exchange algorithm such as, for example, a Diffie-Hellman (DH) algorithm.

In some embodiments, the asymmetric keys may be derived from a single (same) password. For example, a key being communicated between network devices may be encrypted on a first network device using a password-based key derived from a password. The encrypted key then may be transmitted to a second network device, on which the encrypted key is decrypted using a different password-based key derived (obviously, in a different way) from the same password.

In some embodiments, knowledge of a password (or at least partial knowledge of the password, as described in more detail below) may serve as a basis of authentication between two or more network devices. For example, in the preceding example, the first network device may authenticate an identity of a user associated with the second device based on the second network device's ability to decrypt the encrypted key using a key derived from the same password. That is, the second network device's ability to decrypt serves as evidence of that device user's knowledge of the password. Proof of this knowledge of the password may be conveyed by the second network device to the first network device. For example, a session key (e.g., in accordance with a key-exchange algorithm being used) may be generated as a function of the decrypted key, and a function of this session key (e.g., a hash of the session key) may be communicated from the second network device to the first network device.

In some embodiments, knowledge of a password, or at least partial knowledge of a password, may be the only information shared between parties prior to execution of a key exchange. Thus, knowledge or partial knowledge of the password may be the only criteria by which one party will base trust in another party.

As described above, embodiments of the invention may use a key-exchange algorithm. This key-exchange algorithm may be symmetric (i.e., encryption and decryption are performed using the same key) or asymmetric. If the key-exchange algorithm is asymmetric, for example, if it is a Diffie-Hellman algorithm, the key generated on, and communicated from, the first network device may be a public key of the key-exchange algorithm. In such embodiments, the second network device may generate another public key. After decrypting the encrypted public key received from the first network device, the second network device may transmit this key (e.g., along with proof of its generated session key) to the first network device. The first network device then may use this other public key to generate another session key. The first network device may authenticate the user associated with the second network device based on this other generated session key. For example, the first network device may apply to this session key the same function (e.g., hash function) that was applied to the session key generated on the second network device, and compare the resulting value with the function value generated on the second network device. If the values are equal, then the first network device may conclude that the identity of the user has been confirmed.

In some embodiments, the first network device is associated with another user, and the identity of this user may be authenticated by the second network device. For example, the first network device may send the second network device proof of knowledge of the session key generated on the first network device (e.g., a value generated as a function of this session key). The second network device then may use this proof of knowledge to authenticate the identity of the user associated with the first network device. For example, the second network device may compare the function value generated by the first network device to a value the second network device generated as a function of the session key it generated (e.g., as described above).

Alternatively, a user associated with the first network device may be authenticated based on the first network device's use of its generated session key. For example, the first network device may send a communication to the second network device that includes information (e.g., a message) encrypted using the session key generated on the first network device. If the session key is the same as the session key generated on the second network device, then the second network device should be able to decrypt the message using the session key, thereby authenticating the user associated with the first network device. If the second network device's application of its generated session key to the encrypted information produces an unrecognized or unverifiable result, the second network device may conclude that the user of the first network device is not the person (or other entity) that the first network device represents the user to be.

Other advantages, novel features, and objects of the invention, and aspects and embodiments thereof, will become apparent from the following detailed description of the invention, including aspects and embodiments thereof, when considered in conjunction with the accompanying drawings, which are schematic and which are not intended to be drawn to scale. In the figures, each identical or nearly identical component that is illustrated in various figures is represented by a single numeral. For purposes of clarity, not every component is labeled in every figure, nor is every component of each embodiment or aspect of the invention shown where illustration is not necessary to allow those of ordinary skill in the art to understand the invention.

DETAILED DESCRIPTION

Although some embodiments for the invention described herein are discussed primarily in relation to use of the Diffie-Hellman (DH) algorithm and/or the use of an RSA-like modulus, the invention is not so limited. Any of numerous other key-exchange algorithms may be used such as, for example, a Hughes algorithm, a station-to-station-protocol, Shamir's three-pass protocol, communications setup (COMSET) protocol, EKE or SPEKE protocols, a fortified key negotiation protocol, a conference key distribution and secret broadcasting protocol, other protocols, or any suitable combination of the foregoing. Further, any of numerous other types of moduluses may be used.

Further, although some embodiments are discussed primarily in relation to use of passwords for authentication, the invention is not so limited. Other types of authentication may be used and are intended to fall within the scope of the invention.

For illustrative purposes, the term "PAAKE" is used frequently throughout this document. This acronym stands for "Password-Authenticated Asymmetric Key Exchange." However, it should be appreciated that the invention is not limited to password-authenticated and/or asymmetric key exchanges. The term "PAAKE exchange" is synonymous with PAAKE, the word "exchange" being redundant.

In some embodiments, keys (e.g., keys of a key-exchange algorithm) may be exchanged, in which some of the key exchanged information (e.g., public key information) may be asymmetrically encrypted. For example, cryptographic techniques described herein may asymmetrically encrypt and decrypt keys (e.g., of a key-exchange algorithm) using what are sometimes referred to as a "private key" and a "secret public key", respectively, each of which may be derived from a same password. In some embodiments, the secret public key is derived from the password, and the private key is derived from the secret public key, as is described in more detail below.

In some embodiments, in contrast to known PB-AKE protocols, the party to a key exchange may have only partial knowledge of the password, but that knowledge is sufficient to enable it to participate in a PB-AKE exchange though not sufficient to allow it to pose as an actual password-holder—i.e., without augmenting the PB-AKE protocol. Providing a party such capability may be facilitated using asymmetric cryptology technology techniques, as described in more detail below.

The function and advantage of these and other embodiments of the present invention will be more fully understood from the examples provided below. Those examples are intended to facilitate a better understanding and illustrate the benefits of the present invention, but do not exemplify the full scope of the invention.

As used herein, whether in the written description or the claims, the terms "comprising", "including", "carrying", "having", "containing", "involving", and the like are to be understood to be open-ended, i.e., to mean including but not limited to. Only the transitional phrases "consisting of" and "consisting essentially of", respectively, shall be closed or semi-closed transitional phrases, as set forth, with respect to claims, in the United States Patent Office Manual of Patent Examining Procedures (Eighth Edition, Revision 2, May 2004), Section 2111.03.

EXAMPLES

Figure 1:
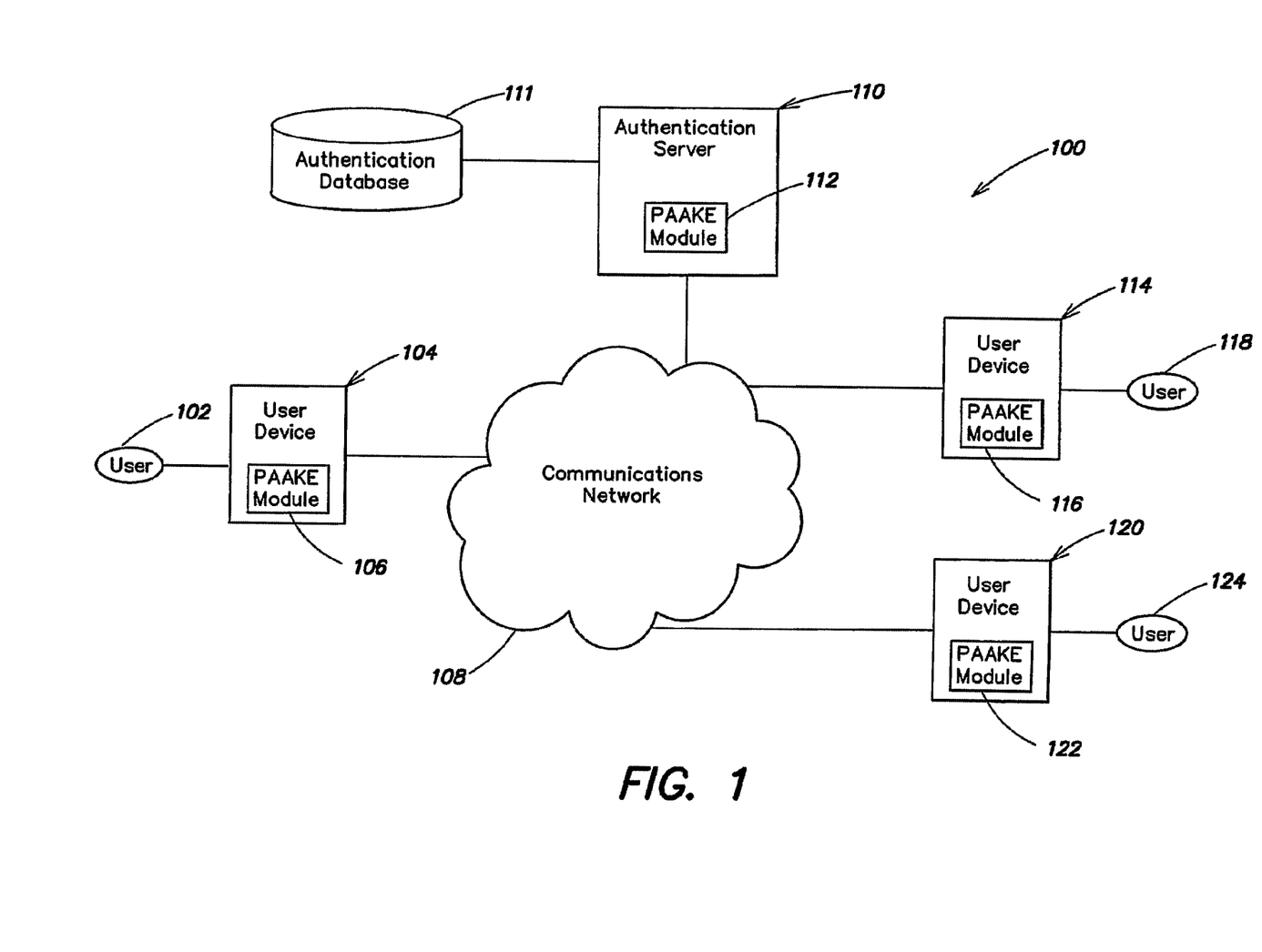
FIG. 1 is a block diagram illustrating an example of a system for implementing a PAAKE, according to some embodiments of the invention.

FIG. 1 is a block diagram illustrating an example of a system 100 for implementing a PAAKE exchange according to some embodiments and teachings of the invention. System 100 is merely an illustrative embodiment of a system for implementing a PAAKE exchange, and is not intended to limit the scope of the invention. Any of numerous other implementations of such a system, for example, variations of system 100, are possible and are intended to fall within the scope of the invention.

System 100 may include any of: users 102, 118 and 124; user devices 104, 114 and 120; one or more authentication servers 110; an authentication database(s) 111; communications network(s) 108; other components; and any suitable combination of the foregoing.

As used herein, a "network" is a group of two or more components interconnected by one or more segments of transmission media on which communications may be exchanged between at least some of the components. Each segment may be any of a plurality of types of transmission media, including one or more electrical or optical wires or cables made of metal and/or optical fiber, air (e.g., using wireless transmission) or any combination of these transmission media. As used herein, "plurality" means two or more. It should be appreciated that a network may be as simple as two devices connected by a single wire, bus, wireless connection, or other type of transmission segment(s). Further, it should be appreciated that when a network is illustrated in a drawing of this application as being connected to an element in the drawing, the connected element itself is considered part of the network and the connection need not be persistent.

As used herein, a "network device" is a device operative to communicate on a network, including, but not limited to: workstations, personal computers, terminals, laptop computers, end stations, user devices, servers, gateways, registers, switches, routers, hubs, bridges, directories, transmitters, receivers, repeaters, and any combinations thereof. As used herein, a "user device" is a network device from/to which a (human or machine) user may send/receive communications, and which may serve as an endpoint to communications on a communications network. User devices include, but are not limited to: workstations; personal computers (e.g., PCs); laptop computers, notebook computers; telephones (e.g., landline or mobile); pagers; Blackberry™ brand devices, PCS devices, personal digital assistants (PDAs), two-way radios (e.g., "walkie-talkies"), other types of user devices, and any suitable combination of the foregoing. As used herein, an "authentication server" is a logical entity residing on a network device, which is operative to authenticate a user as part of a cryptographic algorithm.

Two or more of user devices 104, 114 and 120 and authentication server 110 may be configured with a PAAKE module (e.g., modules 106, 116, 122 and 112, respectively). Each PAAKE module is a logical entity configured to implement one or more aspects of a password-authenticated asymmetric key exchange.

In some embodiments, user devices may exchange communications between each other such that implementation of a PAAKE method serves to authenticate a user of one of the user devices to one or more users of other user devices. For example, such authentication may be implemented as shown and described in relation to FIGS. 2-5.

In some embodiments, a user (associated with a user device) may authenticate to a centralized authentication server (e.g., server 110), rather than to another user device. In such embodiments, a PAAKE module (e.g., 106, 116 or 122) of a user device (e.g., user device 104, 114 or 120) may initiate the exchange of communications with a PAAKE module 112 of an authentication server 110. The authentication server may not be configured with knowledge of the password of the user, but rather with password-based information—i.e., information derived from passwords. Such embodiments are described in more detail below.

System 100, and components thereof, may be implemented using any of a variety of technologies, including software (e.g., C, C#, C++, Java, or a combination thereof), hardware (e.g., one or more application-specific integrated circuits), firmware (e.g., electrically-programmed memory) or any combination thereof. One or more of the components of system 100 may reside on a single device (e.g., a computer), or one or more components may reside on multiple, separate, discrete devices. Further, each component may be distributed across multiple devices, and one or more of the devices may be interconnected.

Further, on each of the one or more devices that include one or more components of system 100, each of the components may reside in one or more locations on the system. For example, different portions of the components of these systems may reside in different areas of memory (e.g., RAM, ROM, disk, etc.) on the device. Each of such one or more devices may include, among other components, a plurality of known components such as one or more processors, a memory system, a disk storage system, one or more network interfaces, and one or more busses or other internal communication links interconnecting the various components. System 100, and components thereof, may be implemented using a computer system such as that described below in relation to FIGS. 6 and 7.

In some embodiments of the invention, an RSA-like modulus may be employed. RSA is an asymmetric (which is often referred to as "public key") cryptographic algorithm. In RSA, a modulus, m, is used for the generation of keys for encryption and decryption, and is the product of two prime numbers, q and r. For systems and methods described herein, an RSA-like modulus may be employed that is the product of three prime numbers, q, r and s, and this RSA-like modulus may be used to generate keys for encryption and decryption. For example, in some embodiments q and r may remain secret and form a standard RSA modulus, and s may be a public prime number whose primeness is verifiable by a party to the key exchange.

Several embodiments, for practicing aspects of the invention are described herein using an illustrative example of a PAAKE that uses a DH key-exchange algorithm and an RSA-like modulus. In this recurring example, per standard cryptography nomenclature, "Alice" represents the party that initiates the PAAKE and "Bob" represents the other party to the PAAKE, who responds to the initiation of the PAAKE by Alice. For this recurring example, the symbols and corresponding meanings shown in Table 1 below are used.

TABLE 1

Meanings of Symbols in Example

| Symbol(s) | Meaning |
|---|---|
| p | DH prime |
| g | DH generator |
| $x_A, x_B$ | DH private exponents of Alice and Bob |
| $y_A, y_B$ | DH public keys of Alice and Bob |
| q, r | secret primes |
| m | = qr, the RSA modulus |
| s | public prime |
| n | = qrs = ms, the PAAKE modulus |
| P | password |
| f( ) | a function applied to the password (typically a hash function) |
| S | =f(P), the PAAKE secret public key |
| Q | $=S^{-1\ mod\ n}$ (inverse of S modulo n), the PAAKE private key |
| E( ) | PAAKE encryption function |
| D( ) | PAAKE decryption function |
| h( ) | a hash or other suitable function used to demonstrate proof of knowledge |

Figure 2:
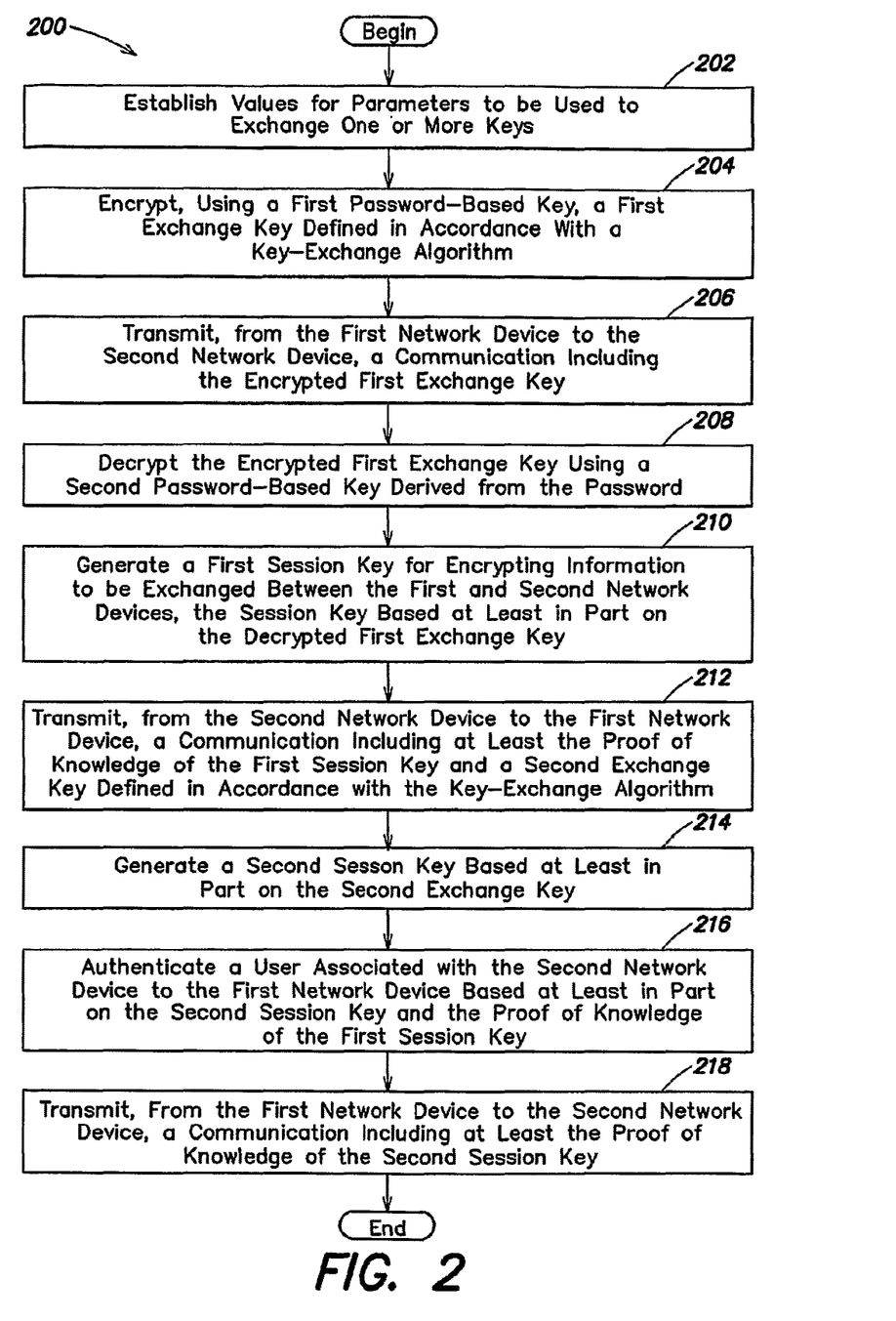
FIG. 2 is a flowchart illustrating an example of a method of implementing a PAAKE, according to some embodiments of the invention.

FIG. 2 is a flowchart illustrating an example of a method 200 of implementing a PAAKE, according to some embodiments of the invention. Method 200 is merely an illustrative embodiment of a method of implementing a PAAKE, and is not intended to limit the scope of the invention. Any of numerous other implementations of such a method, for example, variations of method 200, are possible and are intended to fall within the scope of the invention. Method 200 and acts thereof may be implemented using any of systems 100, 600, 700, or any suitable combination thereof.

In Act 202, one or more values may be established for parameters to be used to exchange one or more keys. These values may be established on one or more network devices (e.g., user devices and/or an authentication server) participating or about to participate in a PAAKE exchange. For example, in an embodiment where a DH key-exchange algorithm and an RSA-like modulus are being used, values for parameters may be established as follows:

1. Choose two secret prime numbers q and r, and compute the RSA modulus m:

m=qr;

2. Choose one public prime numbers; this prime may be agreed upon in advance by the two parties, may be a well-known prime such as an IPsec prime, or may simply be a random prime that may be checked for primeness by the other party;

3. Compute the PAAKE modulus n as the product of the three primes:

n=qrs=ms;

4. Compute Φ(n) (Euler's totient function):

Φ(n)=(q−1)(r−1)(s−1)

5. Compute the secret public key, S, as a function of the password P:

S=f(P), (For example, f( ) may be a hash function. This hash function should be selected to produce a value with a low order bit of 1, in order that its inverse mod Φ(n) (step 6) be computable, as Φ(n) will by definition be an event number);

6. Compute the private key Q as the inverse of S modulo Φ(n). The Chinese Remainder Theorem may be used to optimize the computation:

$S^{-1\ mod\ \Phi(n)}$.

As a result of the above determinations: the PAAKE public information may include at least {m, s}; the PAAKE "secret public" information may include at least {S}; and the PAAKE private information may include at least {q, r, Q}. These parameters may be used for any number of executions of a PAAKE protocol.

Other values may be established as well. For example, to perform a PAAKE negotiation using DH as the underlying key exchange, the parties may agree on DH parameters (e.g., prime p and generator g). DH parameters may be pre-arranged or they may be negotiated during execution of the protocol. If pre-arranged, establishing values also may include Alice generating random value $x_A$ and computing her DH public key:

$y_A=g^{x_A}$.

Figure 3:
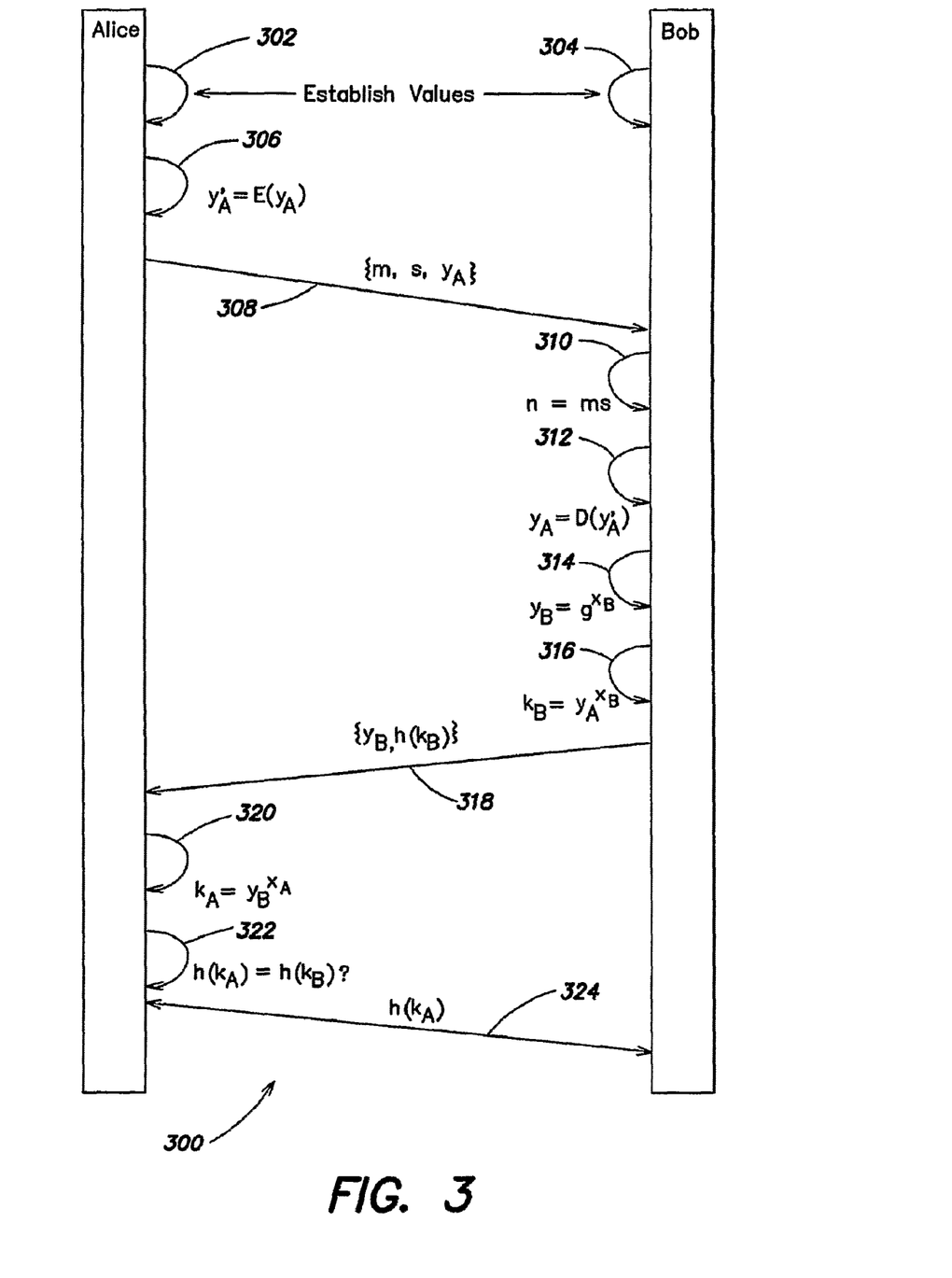
FIG. 3 is a timing diagram illustrating an example of a method of implementing a PAAKE using a DH algorithm and an RSA-like modulus, according to some embodiments of the invention.

Establishing values may be performed by Alice and/or Bob as part of Acts 302 and 304 shown in FIG. 3, respectively.

Digressing briefly from FIG. 2, FIG. 3 is a timing diagram 300 illustrating an example of a method of implementing a PAAKE using a DH algorithm and an RSA-like modulus, according to some embodiments of the invention. FIG. 3 will be referred to throughout for illustrative purposes. However, it should be appreciated that FIG. 3 merely illustrates one example of a method of implementing a PAAKE to exchange keys in accordance with a DH algorithm and using an RSA-like modulus. This example is not intended to limit the scope of the invention, as any of numerous other implementations of such a method, for example, variations of the method shown in timing diagram 300 are possible and are intended to fall within the scope of the invention.

Returning to FIG. 2, in Act 204, a first exchange key defined in accordance with a key-exchange algorithm is encrypted, for example, using a first password-based key (e.g., FIG. 3, Act 306). For the sake of clarity due to the frequent use of the term "key" herein, a key being communicated between parties—i.e., the key being encrypted by one device and decrypted by another—is often referred to herein as an "exchange key." It should be appreciated that the term "exchange" is merely a label, and the key being communicated is not limited to being a key of a key-exchange algorithm. Other types of keys may be used.

In some embodiments of the invention, at least one party may use its PAAKE private key Q to encrypt a DH public key. Further, as is described in more detail below, the other party may use the secret public key S to decrypt. For security reasons, it may be desirable (in some cases essential) that the encrypted first exchange key appear random. Otherwise, if the unencrypted first exchange key can be distinguished as to validity or even probability, then a dictionary attack against the encrypted first exchange key would produce information about the password.

Figure 4:
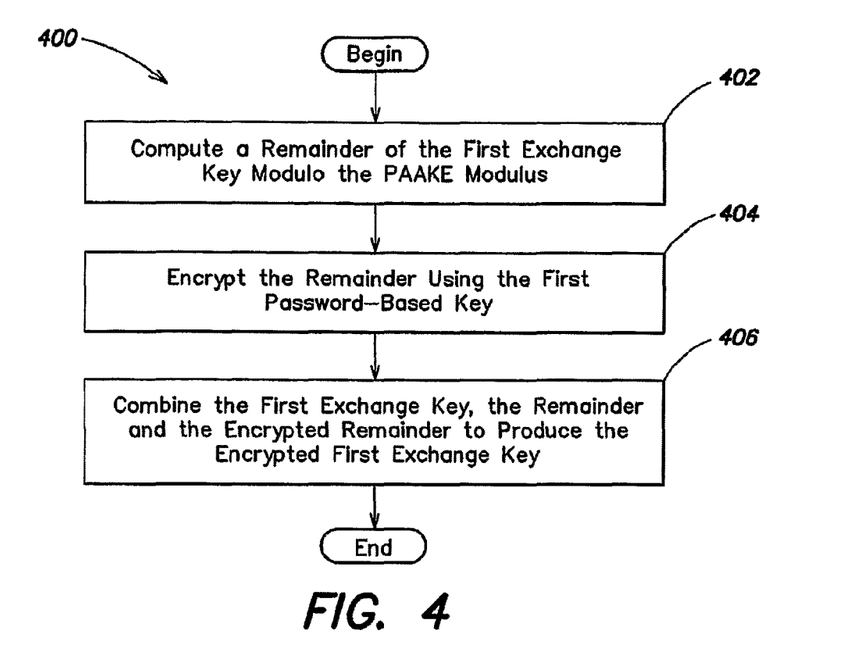
FIG. 4 is a flowchart illustrating an example of a method of encrypting, using a first password-based key, a first exchange key defined in accordance with a key-exchange algorithm, according to some embodiments of the invention.

Digressing briefly from FIG. 2, FIG. 4 is a flowchart illustrating an example of a method 400 of encrypting, using a first password-based key, a first exchange key defined in accordance with a key-exchange algorithm, according to some embodiments of the invention. Method 400 is merely an illustrative embodiment of a method of encrypting a first exchange key defined in accordance with a key-exchange algorithm, and is not intended to limit the scope of the invention. Any of numerous other implementations of such a method, for example, variations of method 400, are possible and are intended to fall within the scope of the invention. Method 400 may include acts in addition to those described herein.

In Act 402, a remainder of a first exchange key modulo the PAAKE modulus may be computed. In the following Act 404, the computed remainder may be encrypted using the first password-based key, and, in Act 406, the first exchange key may be combined with the remainder and the encrypted remainder to produce the encrypted first exchange key.

For example, an encryption function $E(y_A)$ that produces ciphertext $y_A'$, and a decryption function $D(y_A')$ that restores the plaintext $y_A$ may be defined as follows:

$$y_A'=E(y_A); \text{ and}$$

$$y_A=D(y_A')$$

In such an example, the encryption function $E(y_A)$ may be performed as follows:

1. Compute a, the remainder of the public key $y_A$ modulo the PAAKE modulus:

$$a=y_A \bmod n \text{ (e.g., Act 402);}$$

2. Encrypt a using the PAAKE private key, to produce a':

$$a'=a^{Q \bmod n}, \text{ (e.g., Act 404); and}$$

3. Compute the encrypted DH public key E(y):

$$y_A'=E(y_A)=y_A-a+a' \text{ (e.g., Act 406).}$$

Returning to FIG. 2, in Act 206, a communication including the encrypted first exchange key may be transmitted from the first network device to the second network devices. The transmitting communication also may include one or more pieces of public information. For example, Alice may send Bob her PAAKE public information and her DH public key encrypted with her PAAKE private key:

$$\{m,s,y_A'\} \text{ (e.g., Act 308).}$$

On the second network device, in response to receiving the communication, it may be determined whether one or more pieces of information included in the communication (e.g., pieces of public information) are acceptable (not shown). For example, Bob may confirm that is an acceptable prime.

Figure 5:
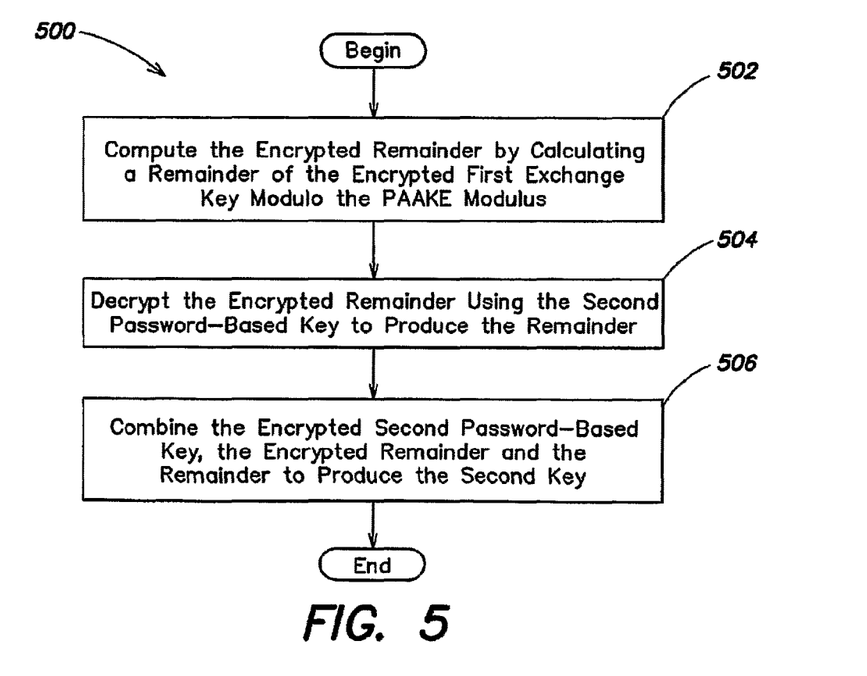
FIG. 5 is a flow chart illustrating an example of a method of decrypting an encrypted exchange key using a password-based key derived from a password, according to some embodiments of the invention.

In Act 208, the encrypted first exchange key may be decrypted using a second password-based key derived from the password, for example, as described in relation to FIG. 5.

Digressing briefly from FIG. 2, FIG. 5 is a flow chart illustrating an example of a method 500 of decrypting an encrypted exchange key using a password-based key derived from a password, according to some embodiments of the invention. FIG. 5 is merely an illustrative embodiment of a method of decrypting an encrypted exchange key using a password-based key derived from a password, and is not intended to limited the scope of the invention. Any of numerous other implementation of such a method, for example, variations of method 500 are possible and are intended to follow within the scope of the invention.

In Act 502, the encrypted remainder of the first exchange key may be computed by calculating a remainder of the first encrypted exchange key modulo the PAAKE modulus. In Act 504, the encrypted remainder may be decrypted using the second password-based key to produce the remainder. In a following Act 506, the encrypted second password-based key, the encrypted remainder and the remainder may be combined to produce the second key.

For example, Bob may compute the PAAKE modulus n: n=ms, for example, using public information received from Alice (e.g., Act 310).

Bob then may decrypt Alice's DH public key by computing $y_A$, using the secret public key, S: $y_A=D(y_A')$ (e.g., Act 312).

For example, the decryption function $D(y_A')$ may be performed as follows:

1. Compute a', the remainder of the encrypted public key $y_A'$ modulo the PAAKE modulus:

$$a'=y_A' \bmod n \text{ (e.g., Act 502);}$$

2. Decrypt a' using the PAAKE secret public key, to produce a:

$$a=a'^{s \bmod n}, \text{ (e.g., Act 504); and}$$

3. Compute the decrypted DH public key $y_A$:

$$y_A=D(y_A')=y_A'-a'+a \text{ (e.g., Act 506).}$$

It may be desirable that $y_A$ potentially have at least as many bits as the PAAKE modulus, n. Otherwise, there would be leading "0" bits in the remainder, a, which would make it susceptible to a guessing attack. Accordingly, to ensure that $y_A$ has at least as many bits as the PAAKE modulus, the DH prime, p, may be configured to have at least as many bits as the PAAKE modulus.

Further, the number of bits in $y_A$ may be configured to exceed the number of bits in the PAAKE modulus, n, by an adequate amount to reduce any unevenness in the probability distribution of the remainder, a, to a negligible value. Configuring $y_A$ as such implies that the DH prime, be configured to have a greater number of bits than n. For example, p may be configured to exceed n by 64 bits or more.

Returning to method 200, in Act 210, a first session key for encrypting information to be exchanged between the first and second network devices may be generated, the session key based at least in part on the decrypted first exchange key.

For example, Bob may generate his own private random value $x_B$ and generate his own DH public key $y_B$:

$$y_B=g^{x_B} \text{ (e.g., Act 314).}$$

Bob then may compute the DH session key $k_B$:

$$k_B=y_A^{x_B} \text{ (e.g., Act 316).}$$

In Act 212, a communication including at least the proof of knowledge of the first session key and a second exchange key defined in accordance with the key-exchange algorithm may be transmitted from the second network device to the first network device. For example, Bob may send Alice a communication including his DH public key and proof of knowledge of the DH session, such as a hash:

$$\{y_B, h(k_B)\} \text{ (e.g., Act 318).}$$

In Act 214, a second session key based at least in part on the second exchange key may be generated. For example, Alice may use Bob's DH public key to compute the DH session key $k_A$:

$$k_A = y_B^{x_A} \text{ (e.g., Act } \mathbf{320}\text{).}$$

In Act 216, the first network device may authenticate the second network device based at least in part on the second session key and the proof of knowledge of the first session key.

For example, Alice may confirm Bob's proof of knowledge by verifying that the session key she computed is the same as the one Bob computed:

$$\text{Is } h(k_A) \equiv h(k_B) \text{ (e.g., Act } \mathbf{322}\text{).}$$

Authentication of the second network device in Act 216 should not be omitted. If the first network device is allowed to use the generated session key prior to authentication of the second network device, an attacker may pose as the user associated with the network device and mount a dictionary attack to determine the session key.

Even though Act 216 authenticates the second network device to the first network device, it does not authenticate the first network device to the second. Explicit authentication of both parties may not be necessary in some systems, as subsequent ability to use the resulting session key provides adequate assurances. However, in some embodiments, if explicit authentication of the first network device by the second network device is desired or required, then a communication including at least the proof of knowledge of the second session key may be transmitted from the first network device to the second network device. For example, Alice may send a communication to Bob including reciprocal proof of knowledge of the DH session key.

As described above, in some embodiments of the invention, a DH exchange algorithm and an RSA-like modulus are employed, including a third, public prime number in the PAAKE modulus. Using this third, public prime may provide certain benefits. Including a third, public prime, s, in the PAAKE modulus should prevent an attacker from using a DH public key and PAAKE modulus specially constructed to allow an online guessing attack at the encryption of the DH public key that has a better probability of success than would be yielded by an online dictionary attack against the password itself.

Suppose, for example, that no public prime number were included in the PAAKE modulus. This would allow Alice to construct a PAAKE modulus that included as one of its factors a divisor of the value to be encrypted. Thus, if n=uv, where u divides y, then there are only v−1 candidate values y' such that D(y').ident.y. By finding a large enough u (which need not be prime), Alice can use a small v to create a modulus that looks plausible but allows a guessing attack. Note that Alice could construct a modulus that is not a product of two primes.

Bob could easily detect such an attack, simply by checking whether y' and the modulus share a common factor.

In a more sophisticated attack, Alice could construct a modulus n where $\Phi(n)$ has many small factors. Whenever a factor of $\Phi(n)$ is also a factor of an exponent, the value of the result of the modular exponentiation is constrained to a subgroup and all further exponentiations are constrained to the same subgroup. This allows the attacker to attempt to find a combination of DH public key and modulus n with suitable $\Phi(n)$ that will allow a relatively small number of guesses at the encryption of the DH public key y' that produces the actual public key y that the attacker computed. If the number of guesses required in this attack is fewer than the number of guesses required to break the password itself in an online attack, the algorithm is considered broken.

Assuming Alice knows the DH prime p and generator g in advance, to construct such a combination, she might proceed as follows:

1. Using a random exponent x, compute DH public key $x = g^{x \bmod p}$;
2. For a small integer u, compute $y = x^u$ (without modular reduction);
3. If y−1 is not divisible by u, try again;
4. Find a large integer v, such that y−1 is divisible by uv and (uv+1) is prime;
5. If such a v is not found, try again; and
6. Create an RSA modulus n=pq, where p=uv+1 and q is a random prime.

Note that powers of y mod n will now be constrained to a subgroup of order u(q−1). Thus, the larger the v that can be found, the smaller the q that need be used, and the fewer the number of attempts that will be required to guess the encryption of y.

Bob can attempt to detect such an attack, by taking the encrypted value y' to the power of various small integers u, and checking whether $y'^u - 1$ shares a common factor with n. However, for Bob to obtain adequate assurance would require validation of many values of u during operation of the protocol; this would be an unreasonably time-consuming process.

Adding the third, public prime obviates the need for any such countermeasures. The minimum order of the subgroup containing the DH public key y is guaranteed to be s−1, so the larger the s, the harder a guessing attack against y'.

Method 200 may include additional acts. Further, the order of the acts performed as part of method 200 is not limited to the order illustrated in FIG. 2, as the acts may be performed in other orders and/or one or more of the acts may be performed in series or in parallel, at least partially. For example, values may be calculated in parallel throughout the performance of method 200 and in orders other than those described above.

In some embodiments of the invention, a PAAKE exchange is performed between a user device (e.g., any of user devices 104, 114 and 120) and an authentication server (e.g., server 110). For example, an authentication server may be configured with indirect or partial password information, but not the password itself, that enables the authentication server to authenticate users but not pose as a user itself. For example, referring to the recurring sample above, an authentication server may be provided with a PAAKE private key, Q, of a user, which was derived from the user's password, but may not be provided with the user's password itself. Thus, for one or more users of a network, an authentication server may store the following in a database (e.g., database m): {m, n, Q}.

The authentication server may use this information to encrypt an exchange key (e.g., a DH public key) though not as efficiently as it could if it knew the individual factors q and r. Storing information in this form on an authentication server may prevent the server from impersonating the user, and may protect passwords in the event that the central server's database is stolen or otherwise compromised. Although storing information in this manner prevents the passwords themselves from being stolen, the information may be used to launch a dictionary attack against the database to determine passwords. However, if the passwords are strong enough, or if a password entropy enhancement method (e.g., PKCS5) is applied, the ability of a thief to determine passwords from the above information stolen from the database can be significantly reduced, if not eliminated entirely.

Implementing a PAAKE exchange between an authentication server and a user device associated with the user may be performed similarly to implementing a PAAKE between two user devices, for example, as described above in relation to FIGS. 2-5. For example, in some embodiments, where a DH key-exchange algorithm is employed and an RSA-like modulus is used, Bob's role may be that of an authentication server configured with a partial private key for Alice (e.g., {m, r, and Q}). In comparison to the methods described above in relation to FIGS. 2-5, implementing a PAAKE between a user device and an authentication server may involve one or more additional acts. For example, an additional communication may be used to convey Alice's name to Bob to enable Bob to look up the private key associate with her password. A PAAKE exchange may be implemented as follows:

1. Alice sends Bob her name and DH public key;
2. Bob sends Alice his PAAKE public information and his DH public key encrypted with his PAAKE private key Q;
3. Bob computes the session key;
4. Alice confirms that s is an acceptable prime;
5. Alice multiplies m by s to get n;
6. Alice decrypts Bob's DH public key using the modulus, n, and the secret public key, S;
7. Alice computes the DH session key;
8. Alice sends Bob proof of knowledge of that key, such as a hash; and
9. Bob confirms Alice's proof of knowledge.

Note that the final proof of knowledge message from Alice to Bob (Act 8) may not be explicitly required, as the overall protocol may supply it. For example, rather than Act 8, Act 7 may be followed by an informational message from Alice to Bob, encrypted not with the DH session key, thus providing the necessary proof of knowledge implicitly.

Method 200 and other methods described above, acts thereof and various embodiments and variations of these methods and acts, individually or in combination, may be defined by computer-readable signals tangibly embodied on one or more computer-readable media, for example, non-volatile recording media, integrated circuit memory elements, or a combination thereof. Computer readable media can be any available media that can be accessed by a computer. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, other types of volatile and non-volatile memory, any other medium which can be used to store the desired information and which can accessed by a computer, and any suitable combination of the foregoing.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, wireless media such as acoustic, RF, infrared and other wireless media, other types of communication media, and any suitable combination of the foregoing.

Computer-readable signals embodied on one or more computer-readable media may define instructions, for example, as part of one or more programs, that, as a result of being executed by a computer, instruct the computer to perform one or more of the functions described herein (e.g., method 200 and other methods described above or any acts thereof), and/or various embodiments, variations and combinations thereof. Such instructions may be written in any of a plurality of programming languages, for example, Java, J#, Visual Basic, C, C#, or C++, Fortran, Pascal, Eiffel, Basic, COBOL, etc., or any of a variety of combinations thereof. The computer-readable media on which such instructions are embodied may reside on one or more of the components of any of systems 100, 600 and 700 described herein, may be distributed across one or more of such components, and may be in transition therebetween.

The computer-readable media may be transportable such that the instructions stored thereon can be loaded onto any computer system resource to implement the aspects of the present invention discussed herein. In addition, it should be appreciated that the instructions stored on the computer-readable medium, described above, are not limited to instructions embodied as part of an application program running on a host computer. Rather, the instructions may be embodied as any type of computer code (e.g., software or microcode) that can be employed to program a processor to implement the above-discussed aspects of the present invention.

Figure 6:
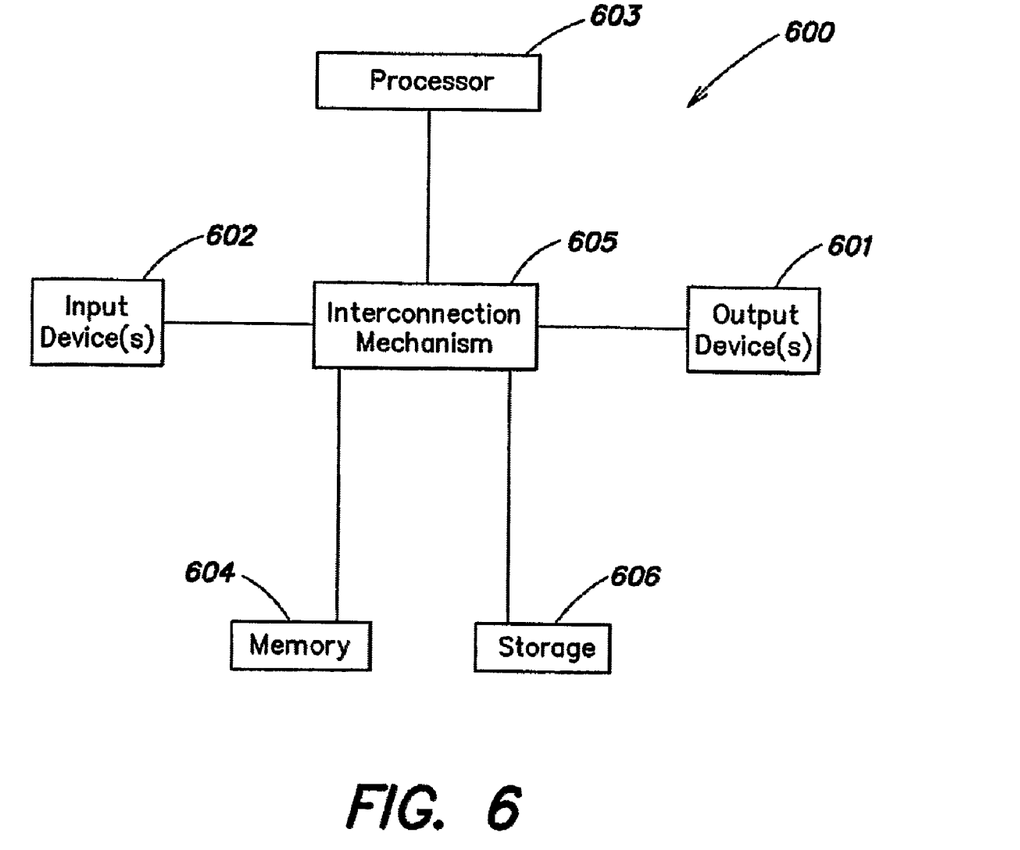
FIG. 6 is a block diagram illustrating an example of a general-purpose computer system that can be used to implement one or more embodiments of the invention.
Figure 7:
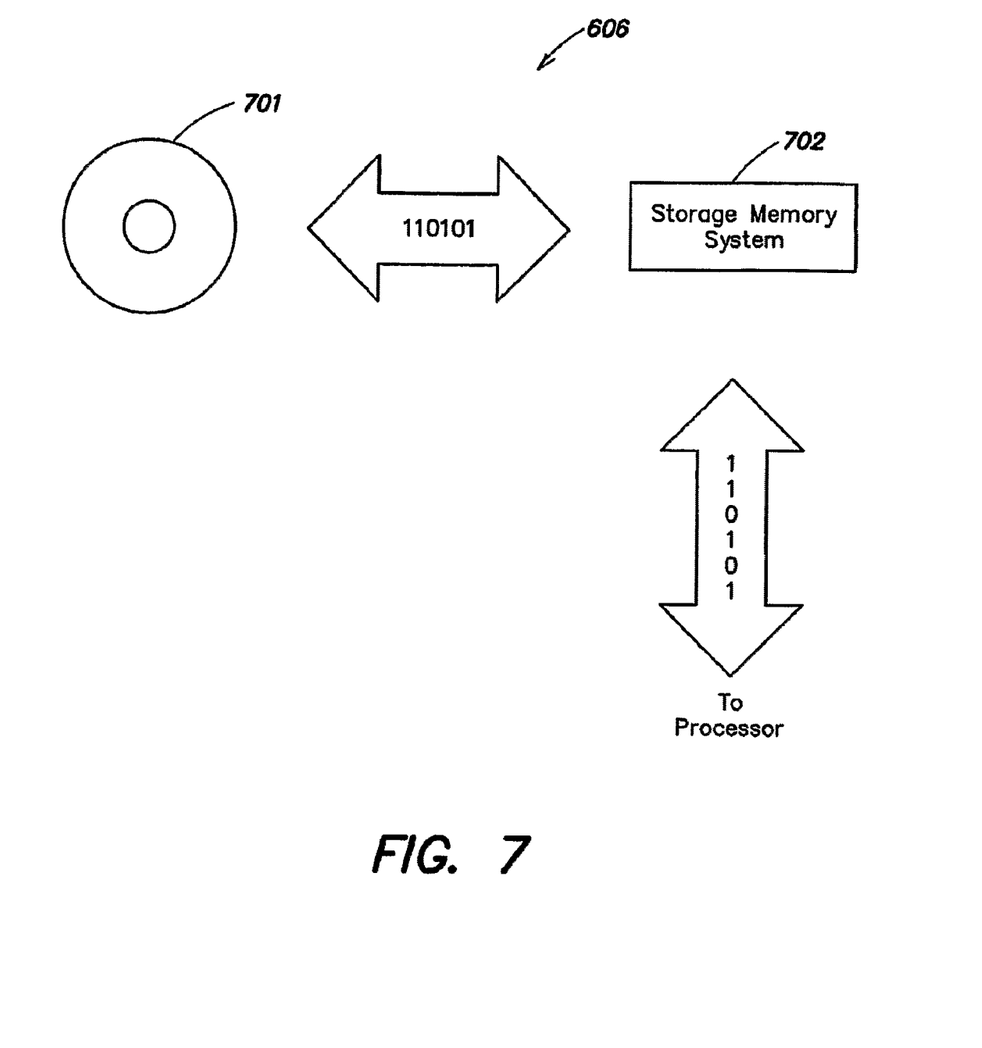
FIG. 7 is a block diagram illustrating an example of a memory sub-system of a general-purpose computer system that can be used to implement one or more embodiments of the invention.

It should be appreciated that any single component or collection of multiple components of a computer system, for example, the computer system described in relation to FIGS. 1, 6, and 7, that perform the functions described herein can be generically considered as one or more controllers that control such functions. The one or more controllers can be implemented in numerous ways, such as with dedicated hardware and/or firmware, using a processor that is programmed using microcode or software to perform the functions recited above or any suitable combination of the foregoing.

Various embodiments according to the invention may be implemented on one or more computer systems. These computer systems, may be, for example, general-purpose computers such as those based on Intel PENTIUM-type processor, Motorola PowerPC, Sun UltraSPARC, Hewlett-Packard PA-RISC processors, any of a variety of processors available from Advanced Micro Devices (AMD) or any other type of processor. It should be appreciated that one or more of any type of computer system may be used to implement various embodiments of the invention.

A general-purpose computer system according to one embodiment of the invention is configured to perform one or more of the functions described above. It should be appreciated that the system may perform other functions and the invention is not limited to having any particular function or set of functions.

For example, various aspects of the invention may be implemented as specialized software executing in a general-purpose computer system 600 such as that shown in FIG. 6. The computer system 600 may include a processor 603 connected to one or more memory devices 604, such as a disk drive, memory, or other device for storing data. Memory 604 is typically used for storing programs and data during operation of the computer system 600. Components of computer system 600 may be coupled by an interconnection mechanism 605, which may include one or more busses (e.g., between components that are integrated within a same machine) and/or a network (e.g., between components that reside on separate discrete machines). The interconnection mechanism 605 enables communications (e.g., data, instructions) to be exchanged between system components of system 600. Computer system 600 also includes one or more input devices 602, for example, a keyboard, mouse, trackball, microphone, touch screen, and one or more output devices 601, for example, a printing device, display screen, speaker. In addition, computer system 600 may contain one or more interfaces (not shown) that connect computer system 600 to a communication network (in addition or as an alternative to the interconnection mechanism 605.

The storage system 606, shown in greater detail in FIG. 7, typically includes a computer readable and writeable non-volatile recording medium 701 in which signals are stored that define a program to be executed by the processor or information stored on or in the medium 701 to be processed by the program. The medium may, for example, be a disk or flash memory. Typically, in operation, the processor causes data to be read from the nonvolatile recording medium 701 into another memory 702 that allows for faster access to the information by the processor than does the medium 701. This memory 702 is typically a volatile, random access memory such as a dynamic random access memory (DRAM) or static memory (SRAM). It may be located in storage system 606 or in memory system 604. The processor 603 generally manipulates the data within the integrated circuit memory 604, 702 and then copies the data to the medium 701 after processing is completed. A variety of mechanisms are known for managing data movement between the medium 701 and the integrated circuit memory element 604, 702, and the invention is not limited thereto. The invention is not limited to a particular memory system 604 or storage system 606.

The computer system may include specially-programmed, special-purpose hardware, for example, an application-specific integrated circuit (ASIC). Aspects of the invention may be implemented in software, hardware or firmware, or any combination thereof. Further, such methods, acts, systems, system elements and components thereof may be implemented as part of the computer system described above or as an independent component.

Although computer system 600 is shown by way of example as one type of computer system upon which various aspects of the invention may be practiced, it should be appreciated that aspects of the invention are not limited to being implemented on the computer system as shown in FIG. 6. Various aspects of the invention may be practiced on one or more computers having a different architecture or components that that shown in FIG. 6.

Computer system 600 may be a general-purpose computer system that is programmable using a high-level computer programming language. Computer system 600 also may be implemented using specially-programmed, special-purpose hardware. In computer system 600, processor 603 is typically a commercially available processor such as any of those described above. Such a processor usually executes an operating system which may be, for example, the Windows.®. 95, Windows.®. 98, Windows NT.®., Windows.®. 2000 (Windows.®. ME) or Windows.®. XP operating systems available from the Microsoft Corporation, MAC OS System X available from Apple Computer, the Solaris Operating System available from Sun Microsystems, Linux available from various sources or UNIX available from various sources. Any of a variety of other operating systems may be used.

The processor and operating system together define a computer platform for which application programs in high-level programming languages are written. It should be understood that the invention is not limited to a particular computer system platform, processor, operating system, or network.

Also, it should be apparent to those skilled in the art that the present invention is not limited to a specific programming language or computer system, and that other appropriate programming languages and other appropriate computer systems could also be used.

One or more portions of the computer system may be distributed across one or more computer systems (not shown) coupled to a communications network. These computer systems also may be general-purpose computer systems. For example, various aspects of the invention may be distributed among one or more computer systems configured to provide a service (e.g., servers) to one or more client computers, or to perform an overall task as part of a distributed system. For example, various aspects of the invention may be performed on a client-server system that includes components distributed among one or more server systems that perform various functions according to various embodiments of the invention. These components may be executable, intermediate (e.g., IL) or interpreted (e.g., Java) code which communicate over a communication network (e.g., the Internet) using a communication protocol (e.g., TCP/IP).

It should be appreciated that the invention is not limited to executing on any particular type of system or group of systems, and that the invention is not limited to any particular distributed architecture, network, or communication protocol.

Various embodiments of the present invention may be programmed using an object-oriented programming language, such as SmallTalk, Java, J# (J-Sharp), C++, Ada, or C# (C-Sharp). Other object-oriented programming languages may also be used. Alternatively, functional, scripting, and/or logical programming languages may be used. Various aspects of the invention may be implemented in a non-programmed environment (e.g., documents created in HTML, XML or other format that, when viewed in a window of a browser program, render aspects of a graphical-user interface (GUI) or perform other functions). Various aspects of the invention may be implemented as programmed or non-programmed elements, or any combination thereof. Further, various embodiments of the invention may be implemented using Microsoft.®..NET technology available from Microsoft Corporation.

Having now described some illustrative embodiments of the invention, it should be apparent to those skilled in the art that the foregoing is merely illustrative and not limiting, having been presented by way of example only. Numerous modifications and other illustrative embodiments are within the scope of one of ordinary skill in the art and are contemplated as falling within the scope of the invention. In particular, although many of the examples presented herein involve specific combinations of method acts or system elements, it should be understood that those acts and those elements may be combined in other ways to accomplish the same objectives. Acts, elements and features discussed only in connection with one embodiment are not intended to be excluded from a similar role in other embodiments. Further, for the one or more means-plus-function limitations recited in the following claims, the means are not intended to be limited to the means disclosed herein for performing the recited function, but are intended to cover in scope any equivalent means, known now or later developed, for performing the recited function.

Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

The invention claimed is:

1. A method of communicating between at least a first network device and a separate, second network device residing on a communications network, the method comprising:
encrypting on the first network device, using a first password-based key derived from a password, a first exchange key defined in accordance with a key-exchange algorithm to produce an encrypted first exchange key;
transmitting, from the first network device to the second network device, a communication including at least the encrypted first exchange key;
decrypting the encrypted first exchange key, on the second network device, using a second password-based key derived from the password and different than the first password-based key;
computing on the first network device the first password-based key using a modulus, n, that is a product of three prime numbers;
calculating the second password-based key by generating a hash value from the password using a hash function;
calculating Euler's totient function, $\Phi(n)$, of the modulus n; and
calculating the first password-based key as the inverse of the second password-based key modulo $\Phi(n)$.

2. The method of claim 1, further comprising acts of:
generating, on the second network device, a first session key for encrypting information to be exchanged between the first and second network devices, the first session key based at least in part on the first exchange key decrypted from the encrypted first exchange key on the second network device; and
transmitting, from the second network device to the first network device, a communication including at least the proof of knowledge of the first session key and a second exchange key defined in accordance with the key-exchange algorithm.

3. The method of claim 2, further comprising acts of:
generating, on the first network device, a second session key based at least in part on the second exchange key; and
authenticating the second network device to the first network device based at least in part on the second session key and the proof of knowledge of the first session key.

4. The method of claim 3, wherein the method further comprises:
generating the proof of knowledge of the first session key on the second network device by generating a first hash value from the first session key using a hash function, wherein authenticating the second network device to the first network device based at least in part on the second session key and the proof of knowledge of the first session key comprises:
(1) generating a second hash value from the second session key using the hash function; and
(2) comparing the first hash value to the second hash value, wherein the second network device is positively identified to the first network device if the hash values are equal.

5. The method of claim 1, wherein two of the three prime numbers are known only by the first network device.

6. The method of claim 1, wherein the password is not known by the first network device.

7. A system for communicating between a first network device and a separate, second network device residing on a communications network, the system comprising:
the first network device;
the second network device;
a first module, residing on the first network device, operative to encrypt, using a first password-based key derived from a password, a first exchange key defined in accordance with a key-exchange algorithm to produce an encrypted first exchange key, and to transmit a first communication including at least the encrypted first exchange key to the second network device; and
a second module, residing on the second network device, operative to receive the first communication and to decrypt the encrypted first exchange key using a second password-based key derived from the password and different than the first password-based key,
wherein the first module is operative to:
calculate the first password-based key using a modulus, n, that is a product of three prime numbers;
calculate the second password-based key by generating a hash value from the password using a hash function;
calculate Euler's totient function, $\Phi(n)$, of the modulus n; and
calculate the first password-based key as the inverse of the second password-based key modulo $\Phi(n)$.

8. The system of claim 7, wherein the second module is operative to:
generate a first session key for encrypting information to be exchanged between the first and second network devices, the first session key based at least in part on the decrypted first exchange key; and
transmit, to the first network device, a communication including at least the proof of knowledge of the first session key and a second exchange key defined in accordance with the key-exchange algorithm.

9. The system of claim 8, wherein the first module is operative to:
generate a second session key based at least in part on the second exchange key; and
authenticate the second network device to the first network device based at least in part on the second session key and the proof of knowledge of the first session key.

10. The system of claim 9,
wherein the second module is operative to generate the proof of knowledge of the first session key by generating a first hash value from the first session key using a hash function, and
wherein the second module is operative to authenticate the second network device to the first network device by (1) generating a second hash value from the second session key using the hash function; and (2) comparing the first hash value to the second hash value, wherein the second network device is positively identified to the first network device if the hash values are equal.

11. The system of claim 7, wherein two of the three prime numbers are known only by the first network device.

12. The system of claim 7, wherein the password is not known by the first network device.

13. A method of communicating between at least a first network device and a separate, second network device residing on a communications network, the method comprising:
deriving, with the first network device, a second password-based key from a password;
generating, with the first network device, a first password-based key based at least on the second password-based key by calculating the first password-based key using a value for Euler's totient function, Φ(n), of a modulus n that is a product of three prime numbers, wherein the second password-based key is different than the first password-based key and is capable of decrypting data encrypted by the first password-based key;

encrypting on the first network device, using the first password-based key, a first exchange key defined in accordance with a key-exchange algorithm to produce an encrypted first exchange key;

transmitting, from the first network device to the second network device, a communication including at least the encrypted first exchange key;

independently deriving, with the second network device, the second password-based key from the password; and decrypting the encrypted first exchange key, on the second network device, using the second password-based key.

14. A system for communicating between a first network device and a separate, second network device residing on a communications network, the system comprising:

the first network device;
the second network device;
a first module, residing on the first network device, operative to:

derive a second password-based key from a password;

generate a first password-based key based at least on the second password-based key by calculating the first password-based key using a value for Euler's totient function, Φ(n), of a modulus n that is a product of three prime numbers, wherein the second password-based key is different than the first password-based key and is capable of decrypting data encrypted by the first password-based key;

encrypt, using the first password-based key, a first exchange key defined in accordance with a key-exchange algorithm to produce an encrypted first exchange key;

transmit a communication including at least the encrypted first exchange key to the second network device; and a second module, residing on the second network device, operative to:

independently derive the second password-based key from the password; and decrypt the encrypted first exchange key using the second password-based key.

\* \* \* \* \*